Patented Nov. 4, 1941

2,261,459

UNITED STATES PATENT OFFICE 2,261,459

PROCESS OF MANUFACTURING GAS EXPANDED STRUCTURES

Lester Cooper, Milford, Conn., and Hans Z. Lecher, Plainfield, and Frederic H. Adams, Somerville, N. J., assignors to American Cyanamid Company, New York, N. Y., a corporation of Maine No Drawing. Application August 9, 1938, Serial No. 223,814

6 Claims. (Cl. 260—724)

Our invention relates to a novel closed cell gas expanded rubber and the process of making the same by means of an internally developed gas, and more specifically it relates to a closed cell gas expanded rubber formed by the evolution of nitrogen from a diazo amidine and the method of controlling the fibre strength of the rubber while releasing the gas from the diazo amidine so as to obtain a closed cell structure.

The nitrogen evolving substances employed in our process are condensation products of aromatic or heterocyclic diazo compounds with amidines, these amidines having at least one reactive hydrogen attached to a nitrogen of the amidine group capable of reacting with diazo components and these amidines being free from substituents capable of azoic coupling, such as amino-aryl or hydroxy-aryl groups.

The term rubber is to be construed broadly as including compounded or uncompounded rubber, natural rubber and rubber substitutes such as polymers of diolefines with conjugated double bonds, mixed polymers of such hydrocarbons and other unsaturated compounds, the reaction products of metal sulfides and polysulfides on organic polyhalogen compounds and the like.

Although the manufacture of closed cell rubber shall be specifically dealt with, it is to be understood that closed cell structures can be manufactured using other plastic materials such as cellulose esters, cellulose ethers, polymerized vinyl and acrylic compounds, alkyd resins, urea-formaldehyde resins, phenol-aldehyde resins, and the like. The advantages of the present process with regard to the use of this type of chemical blowing agent has special advantages for the manufacture of closed cell structures from all plastic materials.

Sponge rubber is an open celled gas expanded rubber with intercommunicating channels extending throughout.

Closed cell rubber is gas expanded rubber containing closed cells of gas homogeneously distributed throughout the rubber. There is no communication between the separate cells in closed cell rubber and there are no continuous channels.

Sponge rubber, made by mixing with a rubber dough chemicals adapted by reaction to evolve gas, has long been known. This rubber has been made by incorporating throughout a highly plasticized rubber dough, chemicals such as sodium bicarbonate which under heat react with acid present to release carbon dioxide. The gas so evolved in the rubber dough expands the rubber and forms intercommunicating channels throughout giving a sponge-like structure similar to natural sponge.

Although such sponges are good substitutes for natural bath sponges, for many purposes they have serious faults, such as permeability to water, liquids, and gases; rapid deterioration by reason of the greater surface exposure and susceptibility to penetration by deteriorating forces such as water and oxygen; poor resilience; high density; lack of buoyancy; and poor insulating qualities.

Closed cell gas expanded rubber has been produced and has found wide commercial acceptance because of its unique combination of desirable properties. By reason of its closed cell rubber structure, it is resilient, water proof, possessed of good sound and heat insulating value, extremely light in weight and structurally strong. It is splendidly adapted for use in low cost housing, for example, since by itself it can be used to form walls and roofs without the use of other materials. The properties pointed out above enable it to completely replace the expensive and high labor cost materials such as brick used before in housing.

But this closed cell expanded rubber has hitherto been made and could only be made by the use of externally applied gas under high pressure, as for instance nitrogen under 3,000 pounds per square inch. The present commercial process of producing gas expanded rubber is set forth and covered in the Denton Patent 1,905,269. This process produces gas expanded closed cell rubber employing an external application of nitrogen to the rubber under a pressure of about 3,000 pounds per square inch. The use of carbon dioxide gas has been attempted in this art because carbon dioxide has a greater solubility in rubber than nitrogen and lower pressures could be employed. But carbon dioxide because of this solubility in rubber and because of the low carbon dioxide content of the air surrounding the finished closed cell gas expanded rubber diffuses out from the finished product and causes collapse of the structure. For this reason satisfactory results could not be obtained with carbon dioxide and the Denton process using nitrogen at 3,000 pounds per square inch has been used.

But the use of high pressures such as 3,000 pounds per square inch necessitates high pressure pumps and a gassing autoclave of tremendous strength. The gassing autoclave used in the Denton process cost about five thousand dollars. The maintenance is exceedingly high. Further, the gassing of rubber by the external application of gas involves a period of time of about three to eight hours. The expensive pressure apparatus and autoclave are thus tied up for long periods of time at each gassing operation. This materially adds to the cost of production of the expanded rubber. The time element where expensive apparatus and labor are involved is most important in commercial processes.

Thus it can be seen that the prior method of manufacturing closed cell gas expanded rubber was costly both from a standpoint of pressure apparatus and time. For this reason the cost of the material has been relatively high and its universal acceptance, as for example in the field of insulation, has been retarded because of the competition of inferior but far cheaper substitutes.

Copending application Serial No. 159,706 of Roberts, Bascom and Cooper discloses a novel method of forming closed cell gas expanded rubber by distributing a chemical blowing agent homogeneously throughout the rubber mass, decomposing the blowing agent to evolve gas within the rubber, and controlling the fibre strength of the rubber to hold the evolved gas in the form of closed cells distributed throughout the rubber.

We have found that a particular class of nitrogen evolving compounds, identified as diazo amidines, form chemical blowing agents of unusual properties, such that new and unexpected results are obtained when such diazo amidines are incorporated in rubber to form a closed cell gas expanded structure. These chemical blowing agents, likewise, are intimately mixed with the rubber and decompose by the application of heat to evolve nitrogen. As will be explained more fully hereinafter, the necessary provision must be made to maintain a proper strength of the rubber so that this released gas is entrapped in the form of closed cells.

In the past in the manufacture of open cell rubber, it has been found possible to obtain nitrogen gas by reaction of sodium nitrite and ammonium chloride within a mix. This reaction, as set forth,

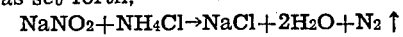

$$NaNO_2 + NH_4Cl \rightarrow NaCl + 2H_2O + N_2 \uparrow$$

is satisfactory for large objects such as tennis balls where there is a measurable wall thickness and hence strength. But in the case of gas expanded rubber where the cell walls are very thin it has many disadvantages. First, steam forms during the cure from the $2H_2O$ and causes additional internal pressure within the mass tending to rupture the cells, this steam pressure being, of course, of a different nature than the nitrogen pressure.

Second, the steam formation is only temporary inasmuch as it soon condenses back to water with a great reduction in volume. Inasmuch as the blow has produced a closed cell there must be some compensation for the contraction of the steam and the ensuing vacuum. To maintain the cell walls in the face of this resulting vacuum, great strength would be necessary, and only a cell wall thickness could produce such a strength. Such a necessary cell wall thickness would be undesirable inasmuch as it would materially add to the weight of the structure.

It is to be noted that in this reaction there are two volumes of water formed for one volume of nitrogen. When the volume relationship between water at room temperature and at 300° F., the blowing temperature, are compared it can be understood why this formation of steam and subsequent condensation back to water represents a serious problem, when it is attempted to use this or similar forms of nitrogen in the manufacture of closed cell gas expanded rubber. This reaction between sodium nitrite and ammonium chloride to produce nitrogen gas represented the most common practice in this art. What has been said with reference to tennis balls is equally applicable to the formation of open celled sponge rubber. This is because in open cell rubber there is no vacuum produced inside the structure because there are continuing channels throughout the mass communicating with the atmosphere. Thus the steam can be discharged and upon condensing there is no collapse of wall structure. In fact in the formation of open celled rubber the extra volume of steam is an advantage inasmuch as it simply produces a greater blow.

But in the formation of closed cell rubber, problems are entirely different inasmuch as a vacuum within the cell is undesirable and residual products of the blowing agent are permanently entrapped therein.

It can be seen, therefore, that there are numerous problems in connection with the selection of a proper chemical blowing agent in the manufacture of closed cell gas expanded rubber. The difficulties pointed out in connection with the nitrogen releasing substances hitherto known have been overcome and a closed cell rubber of excellent quality and permanence has been manufactured by the use of diazo amidines which will be described in detail hereinafter.

As indicated hereinbefore, the nitrogen evolving substances employed as chemical blowing agents in our process are condensation products of aromatic or heterocyclic diazo compounds with amidines, these amidines having at least one reactive hydrogen attached to a nitrogen of the amidine group capable of reacting with diazo components and these amidines being free from substituents capable of azoic coupling, such as amino-aryl or hydroxy-aryl groups.

A great many aromatic and heterocyclic diazo compounds may be used in producing these condensation products and they include also compounds containing more than one diazo group, such as tetrazo compounds.

Typical primary aromatic amines which are useful in producing nitrogen evolving condensation products are, for example, aniline and its homologues; halogenated anilines and their homologues; nitro derivatives of aniline and their homologues; ether derivatives of primary aromatic amines such as the anisidines; monoacyl derivatives of aromatic diamines such as N-benzoyl p-phenylene diamine; the naphthylamines; the amino-anthracenes and the amino-anthraquinones; aminofluorenes; amino diphenylamines; amino-azo compounds such as amino-azo benzene; diamines in which both amino groups are to be diazotized, such as p-phenylene diamine, benzidine, diamino-diphenylamine.

Also heterocyclic primary amines and diamines such as 2-amino-carbazole and 3,6-diamino-carbazole may be used; furthermore sulfonic and carboxylic derivatives of aromatic amines such as sulfanilic acid and anthranilic acid are useful as diazo components.

The amidines to be used in the condensation of diazo components must have at least 1 hydrogen attached to a nitrogen of the amidine radical and this hydrogen must be capable of reacting with the diazo component and of being displaced by the diazo group. Obviously any substituents should not be capable of azoic coupling.

Except for these restrictions, a great number of amidines are useful in the present invention. Straight amidines, such as acetamidine or benzamidine, as well as isoureas and isothioureas and guanidines may be used in making the condensation products with diazo components. Not only guanidine itself, its alkyl, aralkyl, aryl, hydroaryl and heterocyclic derivatives, but also dicyandiamide, biguanide and guanyl-urea and their corresponding derivatives may be condensed with diazo components producing condensation products useful for this invention. Thus guanidine, methyl-guanidine, phenyl-guanidine, diphenyl-guanidine, dicyandiamide, biguanide, methyl biguanide, 1,1'-diethyl-biguanide, phenyl biguanide, guanyl-urea may be mentioned as examples. The guanidine, biguanide or guanyl-urea portion may be also substituted directly by acidic groups such as sulfonic, carboxylic, or nitro groups; as example may be mentioned N-nitro-guanyl-urea and guanyl-urea-N-sulfonic acid. Furthermore aromatic or heterocyclic substituents of the guanidine portion may have other substituents such as halogens, nitro groups, carboxylic groups, sulfonic groups, etc., always provided that such substituents do not render the aromatic residue capable of azoic coupling itself. As examples may be mentioned 4-chloro-phenyl guanyl-urea and 4-biguanyl-benzene sulfonic acid.

Also compounds containing two amidine radicals fall under the scope of this invention, for example m-phenylene-bis-biguanide. Also compounds which contain the amidine group as a whole or part of it in a heterocyclic ring may be used. Such compounds are e. g. imidazole, benzimidazole (1,3-benzodiazole), 1-aminobenzothiazole, amino derivatives of s-triazines such as melamine (2,4,6-triamino-s-triazine), ammeline (2,4-dihydroxy-6-hydroxy-s-triazine), formoguanamine (2,4-diamino-s-triazine), acetoguanide (2-amino-4-hydroxy-6-methyl-s-triazine).

Condensation products having acidic groups, particularly sulfonic groups, in their molecule are advantageously employed in the form of salts such as zinc salts.

The preparation of these compounds which is not the subject matter of this application is easily accomplished by condensing the diazo component in weakly alkaline, neutral or slightly acid medium with the relating amidine compound.

Because of the complex nature of the condensation products their exact formula has not been established and it has not been possible, up to now, to determine exactly the position of the diazo group in the molecule.

The condensation products are, for the most part, yellow in color, they are very stable at moderately elevated temperature, but decompose at the vulcanization temperature of rubber, evolving nitrogen and, in many cases, ammonia.

They are not explosive though some guanyl-urea derivatives puff on heating. Such compounds which are susceptible to puffing may be blended with various ingredients to avoid any hazard. Particularly the customary rubber ingredients, for example stearic acid, are useful as blending agents.

These diazo amidine compounds used as chemical blowing agents in the manufacture of closed cell structures, particularly closed cell rubber, have peculiar utility. They have a decided accelerating action that may be availed of to reduce the necessity for the addition of the usual accelerators and, as such, they eliminate certain of the steps hitherto necessary in the manufacture of these rubber structures, and also effect measurable savings in material costs. It is to be noted that the guanidines, and especially diphenyl-guanidine, are known accelerators and may be employed as the amidines in the formation of the diazo condensation product. This condensation does not materially affect the accelerating properties of these compounds.

Further, certain improved antioxidant characteristics are imparted to the rubber upon the employment of this class of nitrogen evolving blowing agents. Furthermore, many of these compounds decompose with an exothermic reaction. This is an extremely important quality with respect to the manufacture of closed cell structures inasmuch as this blowing agent is to be intimately and homogeneously mixed with the rubber and then, after proper fibre strength conditions of the rubber have been determined, set off by the application of heat. When an exothermic action of the compound is involved, externally applied heat and heat from the diazo amidine sets off the blowing agent near the surface of the rubber. The decomposition of this diazo amidine assists in the initial decomposition of adjacent compound. In view of the fact that it is difficult to make heat penetrate deep into the rubber, this exothermic reaction is important to the transmission into the innermost portions of the rubber of sufficient heat to decompose the blowing compound distributed therein.

As has been pointed out these compounds are stable at moderately elevated temperatures such as are encountered in the milling of rubber and the ordinary preliminary treatments. This is an important consideration since many blowing agents are affected by even moderately elevated temperatures so that a partial evolution of gas is caused. This interferes seriously with the molding processes which are employed in the formation of these structures. The diazo amidines are decomposed only by the employment of such elevated temperatures as are employed in the vulcanization of rubber, as for example about 230° to 290° F.

The diazo amidines further do not discolor the rubber into which they are mixed and have no tendency to bloom or bleed. Another quality that particularly adapts this class of chemicals resides in their fine particle size which is on the order of 300 mesh. The diazo amidines, upon decomposition, evolve nitrogen and leave no undesirable residue material such as oxidizing agents, solvents, water, etc.

A further important factor in regard to the use of the diazo amidines as blowing agents in the formation of gas expanded structures resides in the fact that they evolve large quantities of nitrogen gas upon their decomposition. This nitrogen gas is insoluble in rubber and thus when closed cell gas expanded rubber structures are formed, the nitrogen gas remains within the rubber structure and there is little tendency for the gas to diffuse outward into the atmosphere.

Further, in most cases, an appreciable quantity of ammonia is also evolved so that the gas actually comprises a mixture of nitrogen and ammonia. The ammonia is very soluble in the rubber and tends to permeate the rubber. However, since the ammonia has an advantageous accelerating action and assists in the vulcanization of the rubber, its presence is of utility. Thus, vulcanization is accelerated and facilitated within the rubber, particularly at those portions where the effect of the externally applied heat is diminished. Therefore, it can be seen that the fact that this class of compounds evolves ammonia as well as a larger volume of nitrogen is of great importance.

It is, therefore, the object of our invention to produce a closed cell gas expanded rubber with nitrogen gas contained within the cells.

It is another object of our invention to produce a closed cell gas expanded rubber using as a chemical blowing agent the diazo amidines.

It is a further object of our invention to produce closed cell gas expanded plastics using the diazo amidines as a blowing agent.

It is still a further object of our invention to produce closed cell gas expanded rubber using a class of compounds which release nitrogen or the combination of nitrogen and ammonia gas.

It is a further object of our invention to produce closed cell gas expanded rubber using aryl diazo amidines as a blowing agent.

It is a further object of our invention to produce closed cell gas expanded rubber using a diazo biguanide as a blowing agent.

It is a further object of our invention to produce closed cell gas expanded rubber using a diazo guanyl urea as a blowing agent.

It is a further object of our invention to produce closed cell gas expanded rubber using an aryl diazo biguanide as a blowing agent.

It is a further object of our invention to produce closed cell gas expanded rubber using an aryl diazo guanyl urea as a blowing agent.

Hereinafter there are listed a number of runs that were made with various stocks using certain representative amidine chemical blowing agents as set forth and more fully described hereinbefore. In forming these mixes the rubber was first milled in the usual manner to soften it, and the accelerators, blowing agents, and additional ingredients added on a mill to secure thorough mixing. To obtain a hard rubber structure relatively large amounts of sulfur are employed, and to obtain a soft structure relatively low amounts of sulfur are used. The precure was used in certain of these runs to give the rubber sufficient strength to obtain the closed cell structure desired, but it is within the scope of our invention to use any of the methods of obtaining closed cell structures, such as set forth in the hereinbefore referred to application of Roberts, Bascom and Cooper, Serial No. 159,706.

STOCK—CHEMICALLY BLOWN SOFT SHEET STOCK WITH PRECURE TO INSURE A CLOSED CELL GAS EXPANDED RUBBER STRUCTURE

Ingredients:                                           Parts
   Pale crepe rubber_____ 50.00
   Reclaim rubber_____ 100.00
   Zinc salt of 2-mercaptobenzothiazole_ 0.50
   Sulfur_____ 1.00
   Zinc oxide_____ 10.00
   Stearic acid_____ 1.00
   Condensation product of diazotized aniline with biguanide_____ 20.00
   Mineral oil_____ 10.00

The above stock was precured for 60 minutes at 10 pounds steam and final cured for 30 minutes at 60 pounds steam. The precuring was carried out in a filled 6″ x 6″ x ¼″ mold and the samples were cut into three-inch squares, and cured in a final mold 4″ x 4″ x ½″. The condensation product of diazotized aniline with biguanide produced good cell-tight material.

STOCK—ASPHALT-RECLAIM CLOSED CELL RUBBER COMPOUND

Ingredients:                                           Parts
   Smoked sheets of rubber_____ 25.0
   Reclaim rubber_____ 115.0
   Asphalt_____ 100.0
   Stearic acid_____ 5.0
   Zinc oxide_____ 5.0
   Sulfur_____ 20.0
   Sodium bicarbonate_____ 20.0
   Condensation product of diazotized aniline with m-phenylene-bis-biguanide_____ 5.0
   Condensation product of diazotized aniline with phenyl-biguanide_____ 5.0
   Condensation product of diazotized aniline with biguanide_____ 5.0
   Tetramethyl-thiuram-monosulfide ___ 0.2
   Diphenyl guanidine_____ 0.2

In this run sodium bicarbonate was used to give off carbon dioxide which was utilized as a temporary expanding or blowing agent. This temporary expanding agent carbon dioxide overcomes the resistance to expansion by the rubber mix and the secondary or final amidine blowing agents give the permanent support to the closed cell structure by releasing nitrogen.

The above stock was precured for 20 minutes at 50 pounds steam. The stock was cooled and released from the mold. It then expanded because of the internal pressure of gas which had been generated by the decomposition of the blowing agents. The stock was transferred from the 4″ x 4″ x ½″ precure mold to the final curing mold 9″ x 9″ x 1″ and cured for 2 hours at 85 pounds steam and then cooled and removed.

The results were the production of a rigid and cell tight material.

STOCK—KNEELING MAT STOCK

*Object—To produce light colored closed cell structures by the chemical blow*

| Ingredients | 1 | 2 | 3 | 4 |
|---|---|---|---|---|
| Pale crepe rubber | 100.00 | 100.00 | 100.00 | 100.00 |
| Sulfur | 2.00 | 2.00 | 2.00 | 2.00 |
| Zinc oxide | 2.00 | 2.00 | 2.00 | 2.00 |
| Zinc salt of 2-mercaptobenzothiazole | 0.50 | 0.50 | 0.50 | 0.50 |
| Light calcined magnesia | 5.00 | 5.00 | 5.00 | 5.00 |
| Titanium oxide | 20.00 | 20.00 | 10.00 | 5.00 |
| Condensation product of diazotized aniline with biguanide | 15.00 | 15.00 | 15.00 |  |
| Condensation product of diazotized aniline with guanyl-urea |  |  |  | 15.00 |
| Blue coloring | 1.00 |  | 1.00 | 1.00 |
| Green coloring |  | 2.00 |  |  |
| Stearic acid | 1.00 | 1.00 | 1.00 | 1.00 |

All four runs were cell-tight when tested in a qualitative cell-tight test, that is, a vacuum in a bell jar. They were precured for one hour at 10 pounds steam in a mold 4″ x 4″ x ½″ and final cured for 30 minutes at 60 pounds steam in a mold 8″ x 8″ x 1″. The cell structure of the final product was small and uniform except in a few cases when the steam pressure dropped below the 10 pound steam for a period of time. When insufficient precure fails to give the desired fibre strength (cell-wall strength), small cells rupture one into the other to form communicating cells and thus a sponge structure is obtained instead of a closed cell structure which account for irregular cell structure in both internally blown by chemical and the old type all-tight rubber.

STOCK—CHEMICALLY BLOWN HARD RUBBER

Ingredients: Parts
Pale crepe rubber_____ 100.00
Zinc salt of 2-mercaptobenzothiazole_ 0.5
Zinc oxide_____ 2.0
Light calcined magnesia_____ 5.0
Sulfur_____ 50.0
Condensation product of diazotized aniline with guanyl-urea_____ 20.0

This stock was first precured for 1 hour at 10 pounds steam and then given a final cure for 2 hours at 85 pounds steam. Thereafter it was cooled down and removed.

A hard cell tight rubber with a density of 5–8 pounds per cubic foot was obtained.

It is to be understood that these runs given above are given merely by way of example and represents certain specific illustrations of the workings of the chemical blowing agents of the class described in the various mixes.

The new and unexpected results which have been described in detail are obtained through the use of the diazo amidines as blowing agents and it is within the scope of our invention to employ these blowing agents for making expanded rubber of all varieties and particularly the closed cell gas expanded rubber.

We claim:

1. The method of making closed cell gas expanded rubber which comprises mixing a diazo amidine, the amidine being free from substituents capable of azoic coupling, with rubber, partially vulcanizing the mix of rubber and diazo amidine at a temperature below the decomposition point of the diazo amidine but sufficiently high to obtain the necessary fibre strength of the rubber, and raising the temperature to decompose the diazo amidine and evolve nitrogen therefrom to expand the rubber into a closed cell gas expanded rubber structure.

2. The method of making closed cell gas expanded rubber which comprises admixing a diazo amidine, the amidine being free from substituents capable of azoic coupling, with the rubber and decomposing the diazo amidine to release nitrogen therefrom.

3. The method of making closed cell gas expanded rubber which comprises admixing a diazo biguanide, the biguanide being free from substituents capable of azoic coupling, with the rubber and decomposing the diazo biguanide to release nitrogen therefrom.

4. The method of making closed cell gas expanded rubber which comprises admixing a diazo guanyl urea, the guanyl urea being free from substituents capable of azoic coupling, with the rubber and decomposing the diazo guanyl urea to release nitrogen therefrom.

5. The method of making closed cell gas expanded rubber which comprises admixing an aryl diazo guanyl urea, the guanyl urea being free from substituents capable of azoic coupling, with the rubber and decomposing the diazo guanyl urea to release nitrogen therefrom.

6. The method of making closed cell gas expanded rubber which comprises admixing a diazo amidine, the amidine being free from substituents capable of azoic coupling, with the rubber, subjecting the rubber to treatment which produces sufficient fiber strength in the rubber so that it will not rupture when blown, and then decomposing the diazo amidine to release nitrogen therefrom.

LESTER COOPER.
HANS Z. LECHER.
FREDERIC H. ADAMS.